United States Patent
Hunt

(10) Patent No.: US 12,352,251 B2
(45) Date of Patent: Jul. 8, 2025

(54) ENERGY HARVESTING SYSTEM FOR COLLECTING ENERGY FROM TRANSPORTATION INFRASTRUCTURES

(71) Applicant: Paul Hunt, Redditch (GB)

(72) Inventor: Paul Hunt, Redditch (GB)

(73) Assignee: Paul Hunt, Redditch (GB)

( * ) Notice: Subject to any disclaimer, the term of this patent is extended or adjusted under 35 U.S.C. 154(b) by 0 days.

(21) Appl. No.: 18/478,536

(22) Filed: Sep. 29, 2023

(65) Prior Publication Data
US 2024/0035457 A1 Feb. 1, 2024

(30) Foreign Application Priority Data
Aug. 1, 2022 (GB) ..................................... 2211168

(51) Int. Cl.
*F03G 7/08* (2006.01)

(52) U.S. Cl.
CPC .................................. *F03G 7/085* (2021.08)

(58) Field of Classification Search
CPC ............ F03G 7/08; F03G 7/083; F03G 7/085
See application file for complete search history.

(56) References Cited

U.S. PATENT DOCUMENTS

| | | | |
|---|---|---|---|
| 4,001,597 A | | 1/1977 | Graff |
| 4,081,224 A | * | 3/1978 | Krupp ....................... F03G 7/08 417/244 |
| 4,339,920 A | | 7/1982 | Le Van |
| 4,700,540 A | * | 10/1987 | Byrum ...................... F03G 7/08 60/413 |
| 4,739,179 A | | 4/1988 | Stites |
| 6,376,925 B1 | * | 4/2002 | Galich ....................... F03G 7/08 290/1 R |
| 6,949,840 B2 | * | 9/2005 | Ricketts .................... F03G 7/08 290/1 R |
| 7,315,088 B2 | * | 1/2008 | Erriu ......................... F03G 7/08 290/1 R |
| 8,661,806 B2 | * | 3/2014 | Hendrickson ............. F03G 7/08 60/413 |
| 12,006,921 B2 | * | 6/2024 | McIntosh ................. H02K 7/02 |
| 2006/0218892 A1 | | 10/2006 | Calvert | |

FOREIGN PATENT DOCUMENTS

| | | |
|---|---|---|
| AU | 2012254909 A1 | 6/2014 |
| DE | 101 24 722 A1 | 12/2002 |
| FR | 2 940 985 A1 | 7/2010 |
| GB | 2586244 A | 2/2021 |
| WO | 2005/005831 A1 | 1/2005 |

OTHER PUBLICATIONS

GB Search Report for Application No. GB2211168.6, mailing date of Jan. 16, 2023.
EU Search Report for Application No. 23200307.9, mailing date of Jul. 30, 2024.

* cited by examiner

*Primary Examiner* — Michael Leslie
(74) *Attorney, Agent, or Firm* — Fresh IP PLC; Clifford D. Hyra; Aubrey Y. Chen

(57) ABSTRACT

A device 10 for installation within or on a structure for transferring kinetic energy from a load moving across the structure to a pneumatic or hydraulic system 3 for harvesting this wasted energy. A rocker having an upper surface for passage of the load is pivotally or slidably mounted in a cradle, the cradle housing at least one pneumatic or hydraulic pipe disposed between the rocker and the cradle.

20 Claims, 16 Drawing Sheets

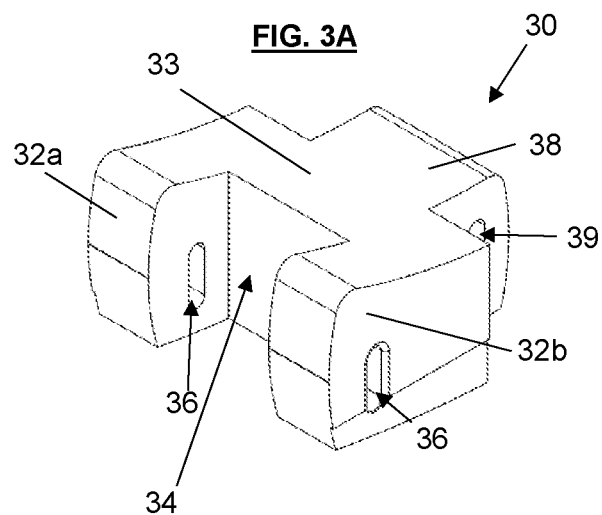
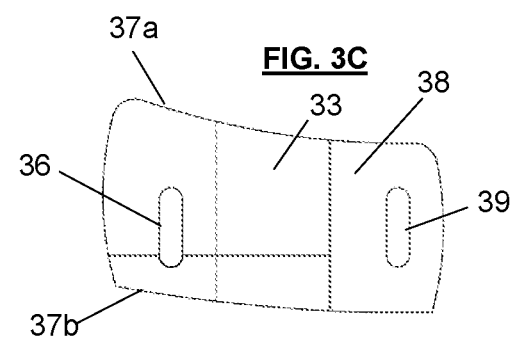
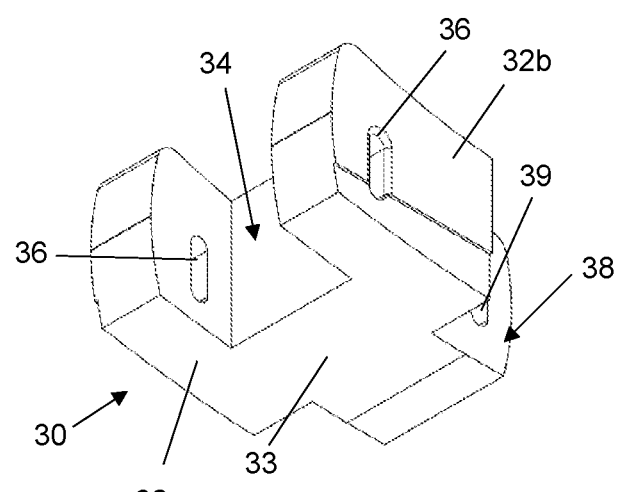
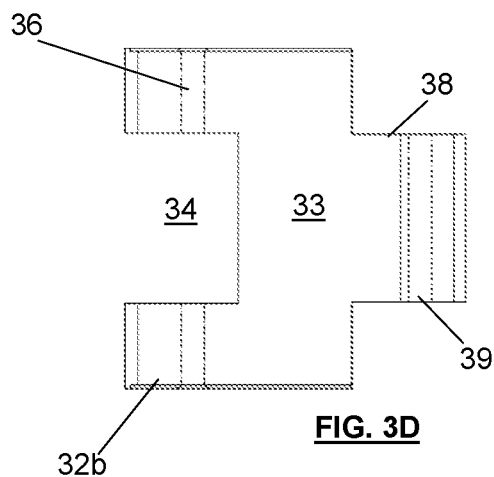

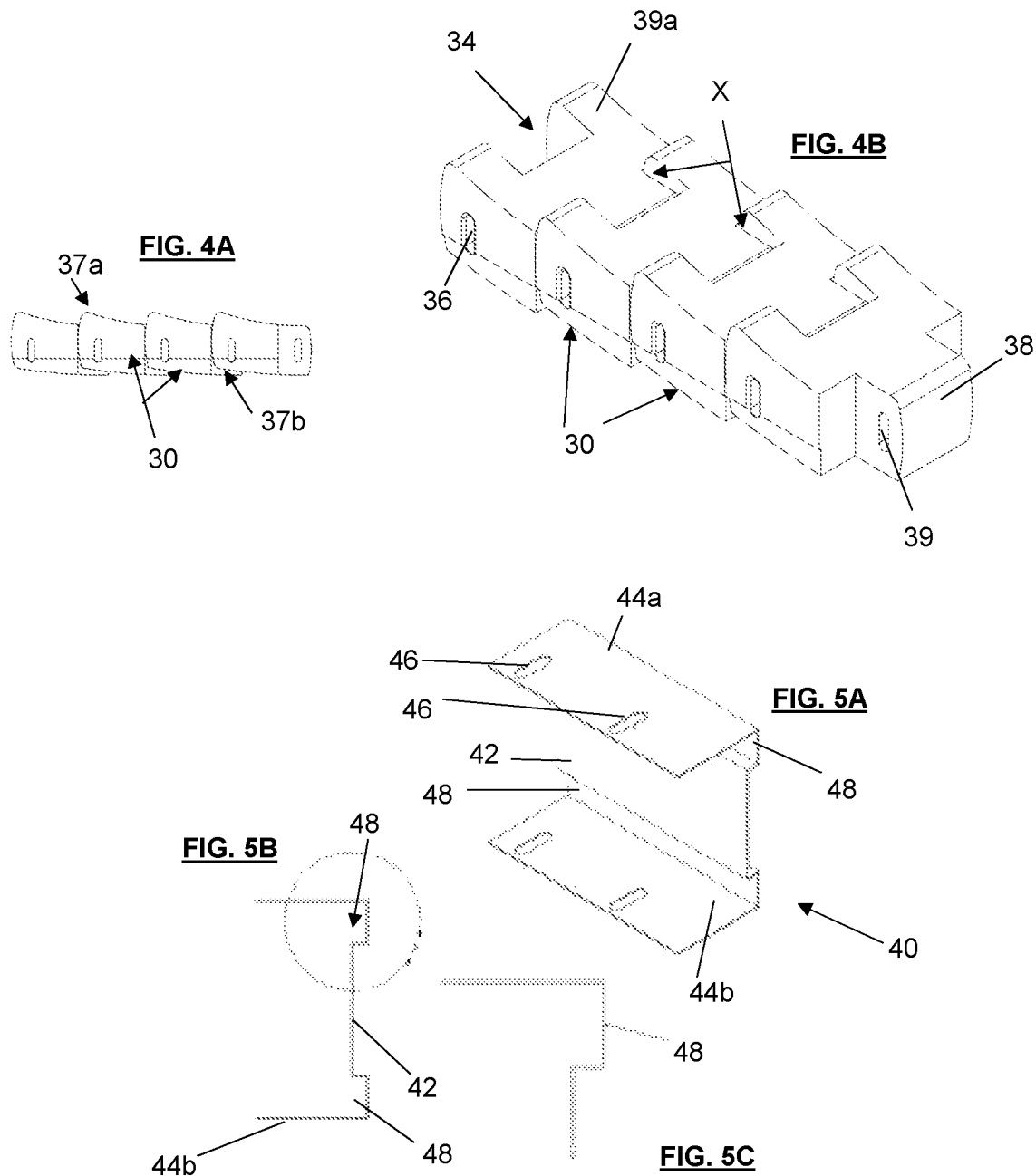

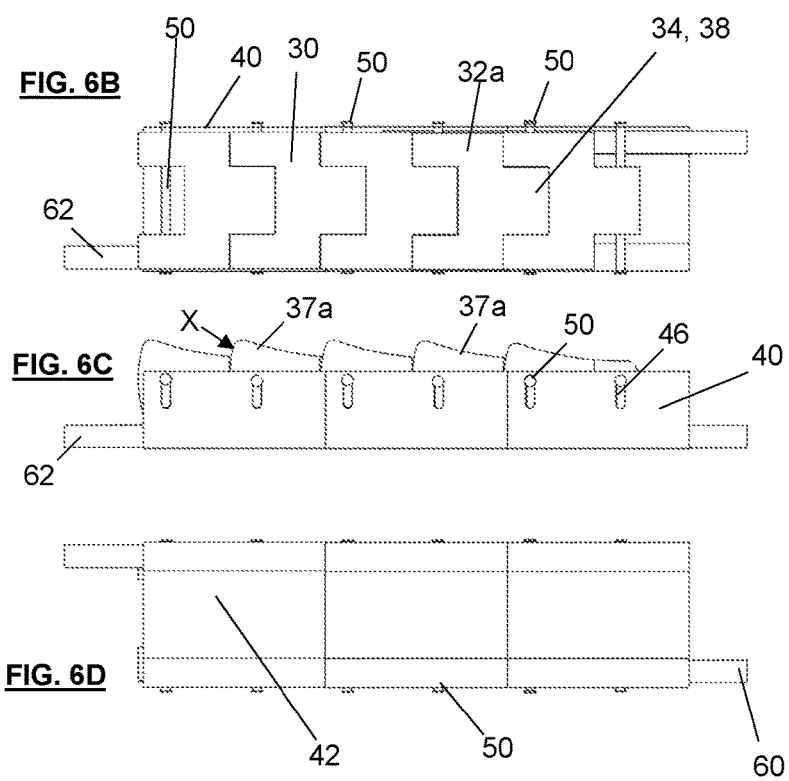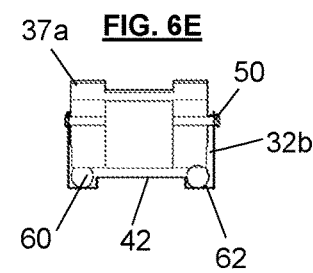

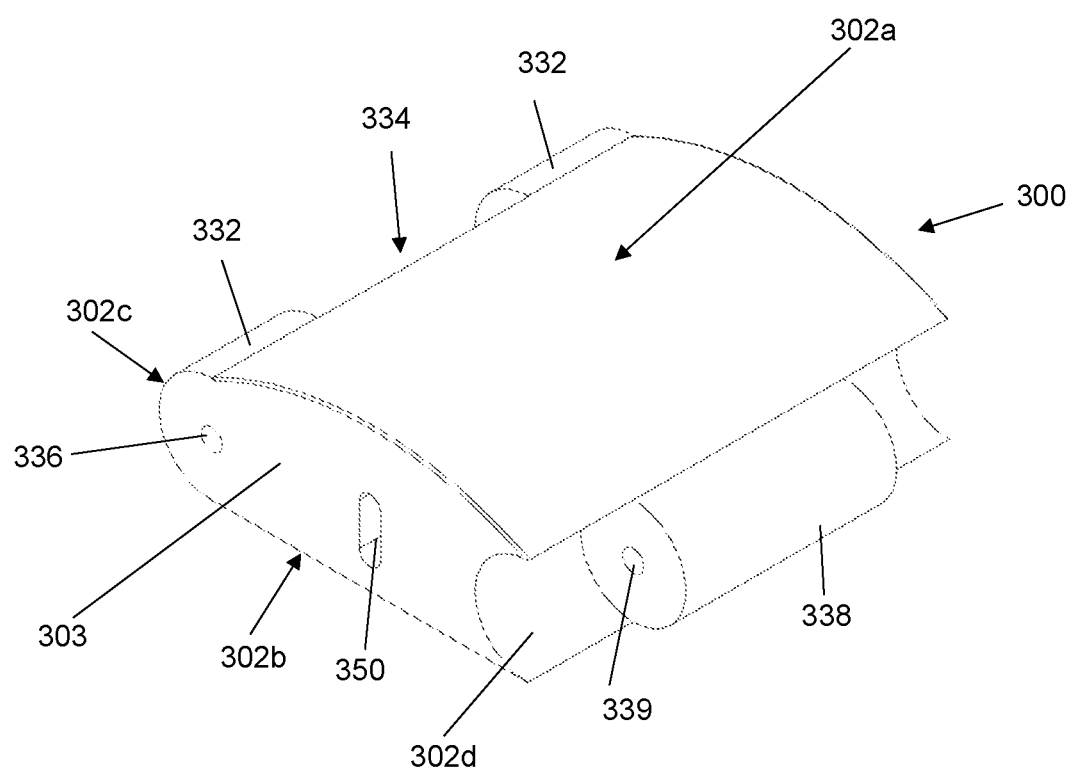

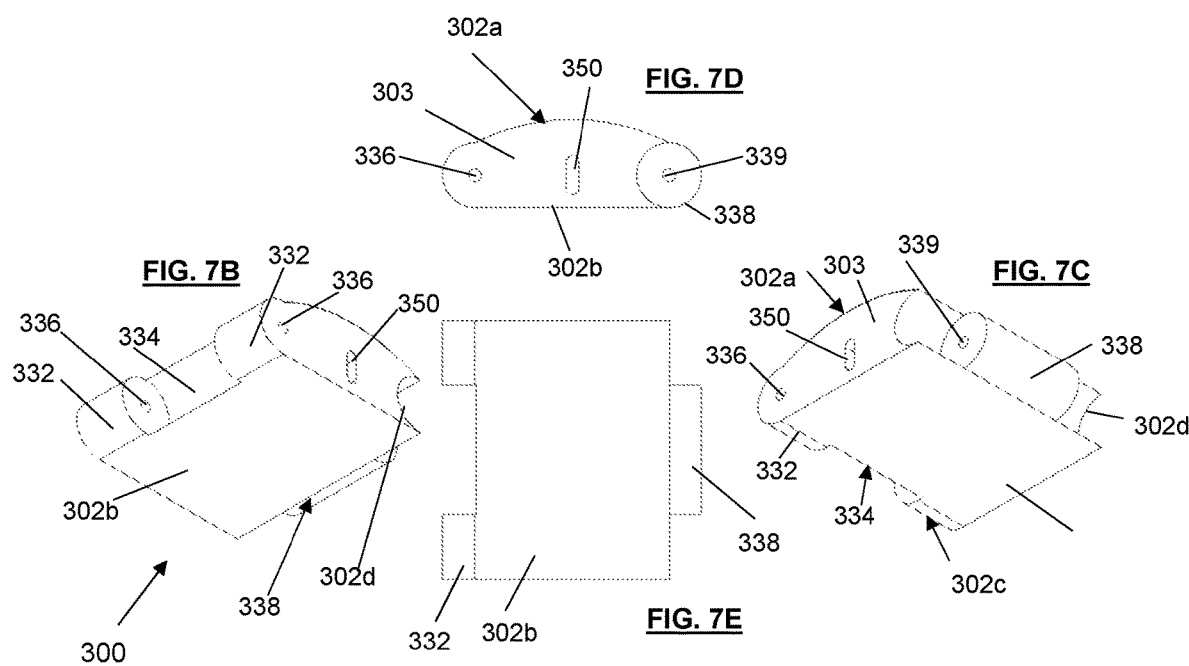

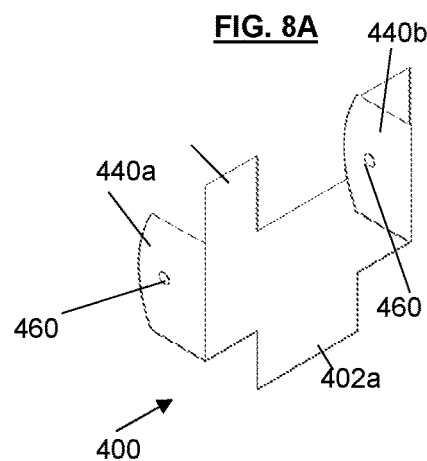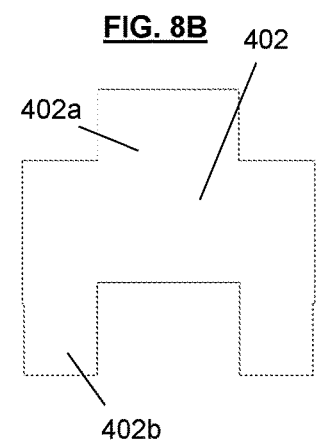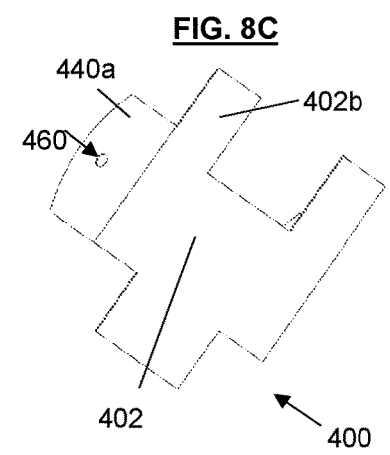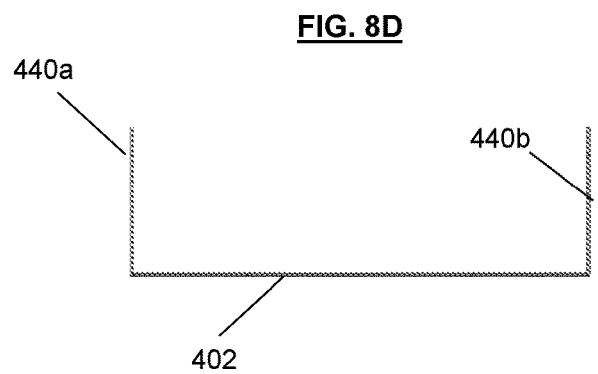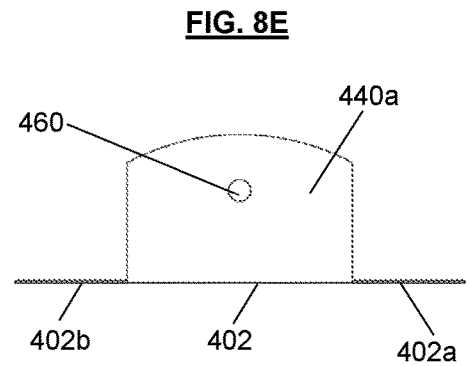

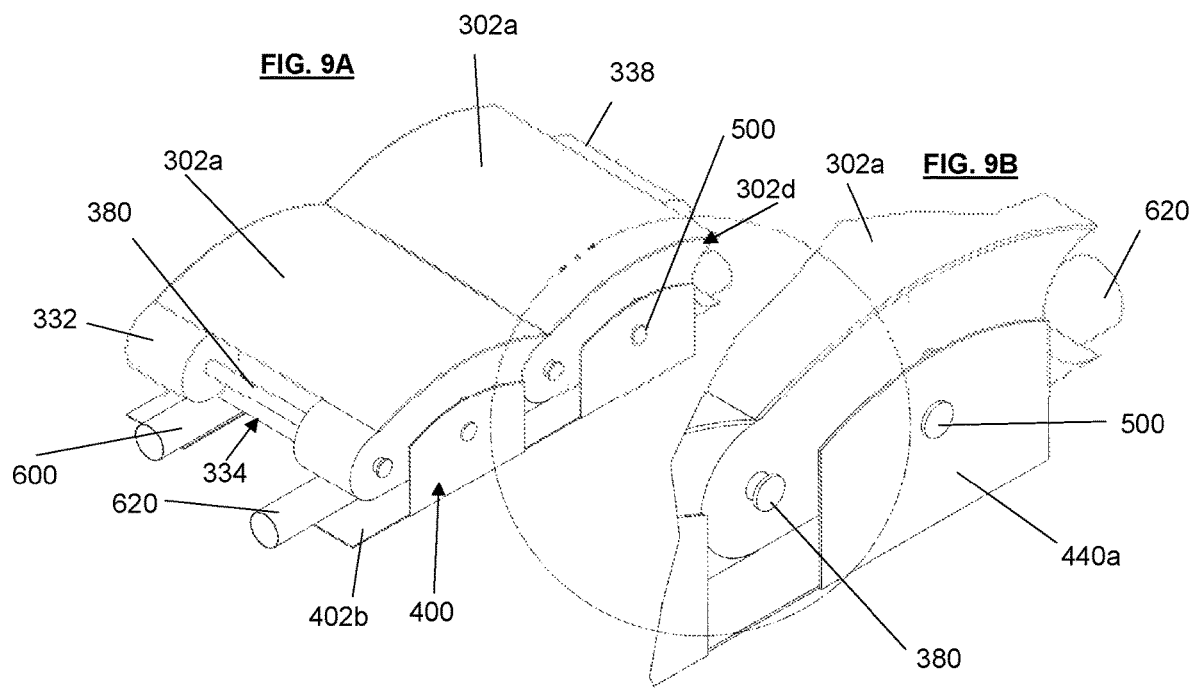
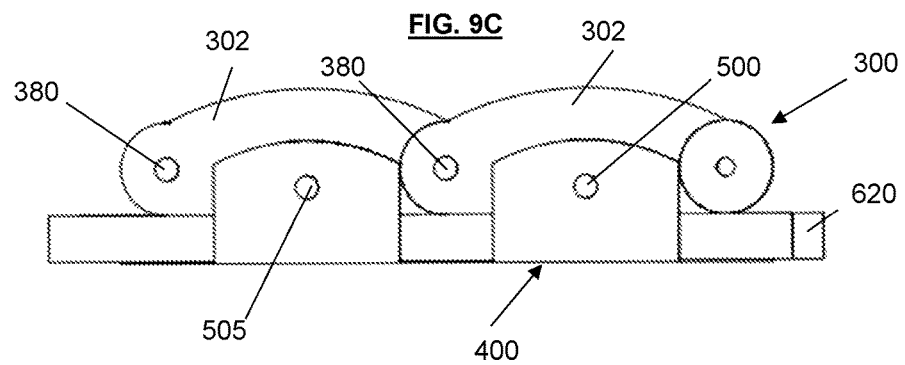

ENERGY HARVESTING SYSTEM FOR COLLECTING ENERGY FROM TRANSPORTATION INFRASTRUCTURES

FIELD OF THE INVENTION

The present invention relates generally to energy harvesting systems for collecting wasted energy from transportation infrastructures, such as roads and car parks.

BACKGROUND

There is a strong desire to move to more renewable and sustainable energy resources to replace our dependence on fossil fuels which are non-renewable and contribute significantly to climate change.

A considerable amount of energy is consumed via different forms of transportation, in particular the heavy traffic on our roads and yet much of this energy is wasted in the form of heat or kinetic energy. Recovering at least some of this wasted energy as electricity would improve our overall energy efficiency. There have been a number of potential advancements in recovering some of this wasted energy from roads and other transportation infrastructures over recent years, such as using solar panels, piezoelectric, thermoelectric and electromagnetic harvesters. WO 2009/098673 A1 describes a device that uses a piezoelectric transducer in the road surface for the production of energy as a result of its deformation due to the passage of vehicles.

An alternative example is disclosed in WO 2018/154543 A1. This relates to a device comprising an electromechanical system or a hydraulic system for energy transmission and conversion. The device is composed of a movable cover surface that is driven by the force exerted by the tyres of moving vehicles. The surface is connected to a crank-linear slide system, with the linear slide moving on a linear guide fixed to the base structure of the device, being in turn connected to a rack-pinion system connected to a shaft which drives a electromechanical converter for converting mechanical energy into electrical energy. Alternatively, the linear slide is connected to the shaft of a hydraulic cylinder connected to a hydraulic circuit, which in turn is connected to a hydraulic actuator. The hydraulic actuator can be rotating or linear and is connected to an electromechanical converter, rotary or linear, either directly or through a mechanical motion-converter system. The device also has a set of springs for opposing the movement of the cover surface to accumulate mechanical energy and for resetting the cover to its initial position and has a set of linear guides connected to the cover and the base for maintaining the translational movement of the cover on the vertical axis only and to ensure a balanced downward movement regardless of the point of application of the load.

These systems do enable energy to be harvested from moving vehicles but may not provide a reliable continuous energy source. While some have been shown to work on at least a micro scale, further work is required to provide an improved system to enable harvesting of a larger proportion of the waste energy that is produced by vehicles passing along a road or other transportation infrastructure, such as on entry to, exit from, or movement within car parks. The provision of a system that can be readily installed within existing transportation infrastructures and be easily maintained or replaced is also desirable.

It is an object of the present invention to provide an improved energy harvesting system for harvesting kinetic energy from movement of vehicles over surfaces such as roads that overcomes, or at least alleviates, the abovementioned problems.

SUMMARY OF THE INVENTION

According to one aspect of the present invention there is provided a device for installation within or on a structure for transferring kinetic energy from a load moving across the structure to a pneumatic or hydraulic system, the device comprising a rocker having an upper surface for passage of the load and a cradle for supporting the rocker within or on the structure, wherein the rocker is at least one of pivotally and slidably mounted to the cradle, the cradle housing at least one pneumatic or hydraulic pipe disposed between the rocker and the cradle.

The at least one pneumatic or hydraulic pipe contains fluid, such as air or water. Movement of the load, such as a vehicle, across the upper surface of the rocker causes the rocker to pivot and/or slide relative to the cradle. This causes compression of the pipe to affect flow of fluid. This in turn may be used to harvest or generate energy, such as electricity.

The rocker may comprise a plate having the upper contact surface, the upper surface preferably being substantially planar and having at least two side members extending from opposing edges of the plate. Each side member preferably has converging dependent sides. Preferably, the sides meet at an apex at a lowermost point opposite the upper surface and a pivot point is provided between the converging sides, preferably above the apex. It is preferable for the sides to be arcuate to provide camming surfaces.

The pivot point may comprise a hole for receipt of a pin. The pin may be fastened to the cradle, or vice versa. A pivot pin may be provided through each side member of the rocker or a single pin may pass from one to the other for securement to the cradle.

Preferably, a compressible pipe is provided beneath, preferably directly beneath, each converging wall of the rocker, in particular beneath each camming surface.

The cradle or bracket preferably has a base and side walls extending upwardly therefrom. The side walls are preferably substantially parallel. The base preferably receives the at least one compressible pipe and the side walls of the cradle are provided with the connection to the pivot point of the rocker. For example, each side wall may have a bore for receiving a pin that pivotally connects the rocker to the cradle or bracket. However, it is to be appreciated that in its simplest form the cradle may be formed from two substantially parallel members for pivotal or slidable connection to the at least one rocker, with the surface of the structure forming a base for receipt of the at least one pipe.

The rocker plate being pivotally mounted to the cradle allows for reciprocal movement of the plate on the pipe below for the transfer of kinetic energy. In a preferred embodiment of the present invention, the rocker and cradle are configured to provide an oscillating motion on the pipe below improving the transfer of kinetic energy along the pipe. This is achieved by configuring the rocker to allow a rolling motion or a pivoting and sliding motion of the rocker with respect to the pipe.

Preferably, the upper surface of each rocker inclines upwardly in a direction of movement of the load. More preferably, each rocker has substantially parallel upper and lower surfaces, both being inclined upwardly in the intended direction of movement of the load. Each rocker is provided with at least one slot between the upper and lower surfaces for pivotal and slidable connection to the at least one cradle, with at least one pipe being provided below the lower surface.

More preferably, multiple adjacent rockers are provided in a single or multiple cradles to provide a longitudinal surface track for passage of the load, the least one pipe being supported along the longitudinal surface beneath the rockers. Preferably, adjacent rockers are configured to interconnect to provide rolling compression of a pipe as a load travels along the longitudinal surface.

In one embodiment, each rocker may be substantially U-shaped comprising two substantially parallel legs connected by a body portion, the legs being separated by a recess and each having a vertical slot. A rear member preferably extends from the body portion and also includes a corresponding slot. The front recess is preferably of a similar dimension to the rear member to enable the recess of one rocker to receive the rear member of an adjacent rocker. The slots of the legs of one rocker preferably align with the slot through the rear member of an adjacent rocker.

At least the upper, preferably the upper and lower surfaces of the legs, curve upwardly to provide a rocking or cam surface. This results in the front part of each leg being higher than the rest of the rocker.

The cradle or bracket is provided for receiving one or multiple rockers and again preferably has a base and substantially parallel side walls. Preferably, vertical slots are provided in the side walls and are provided at spaced apart intervals, preferably being the distance corresponding to the distance between slots of adjacent rockers. One or more pins are placed through the slots of the cradle and rocker to enable movement of the rocker with respect to the cradle.

Preferably, the base of the cradle is configured to provide two parallel longitudinal troughs running along each side of the base for housing the compressible pipe. More preferably, these troughs align with the legs of adjacent rockers.

It is to be appreciated that a cradle may house any number of rockers with the cradle being provided with a corresponding number of slots.

It is preferable for the pin located within the slot to be a height that is sufficient to provide enough compression of the pipe beneath, preferably being at least 25 mm in length. More preferably, the length of the slot is substantially equal to the diameter of the pipe. The pipe may have an elliptical cross-section to aid transfer of pressure.

The inclined slope provided by the upper surface of the rocker provides the rolling pressure alone the pipe rather than an upward/downward reciprocal pressure on the pipe. Ideally each leg of the rocker is of a width to support a wheel of a car or other vehicle, for example being 400×400 mm.

In another preferred embodiment of the present invention, the rocker is both pivotally connected to an adjacent rocker and slidably mounted to its cradle. This further enhances the oscillating motion provided along the pipe as a load passes over the surface of the rockers.

Preferably each rocker is configured to mate with an adjacent rocker and a pivot point is provided between the mating parts. More preferably, the pivotally mounted mating parts each have an arcuate surface to aid rotation with respect to each other. Each rocker is separately slidably connected to the cradle. Preferably, a central slot is provided through each rocker for passage of a pin connected to the cradle. It is preferable for the slot to allow a predefined amount of vertical movement of the rocker with respect to the cradle, such as substantially equal to the diameter of the pipe.

Preferably, the rocker has a main body having an upper section, a base, side walls, a front wall and a rear wall. The base may be substantially flat but preferably the upper section has at least a small angle of curvature.

Preferably, the front wall is convex, comprising a recess flanked by cylindrical arms with a bore extending through each of the arms, and the rear wall is concave and is provided with a substantially cylindrical central portion having a central bore. The central portion and recess form the mating parts of adjacent rockers.

It is preferable for all parts of the device according to the present invention to be made from durable materials that will withstand repeated application of loads. Preferably, the rocker is made from a single moulded component and should form a solid structure, for example, comprising rubber crumb to ensure sufficient transfer of pressure through the device.

The cradle or bracket may be made from a strong metallic material, such as a galvanised steel. The pivot pins should also be made of strong materials, such as reinforced stainless steel. The hydraulic pipes again should be durable but have the required degree of compressibility.

It is to be appreciated that a device according to the present invention, more preferably a series of devices, could be installed in a variety of structures that are subject to frequently moving loads. Examples, include road surfaces, pavements, junctions, car parks and entrances to car parks. Embodiments having rockers with a more curved upper surface profile can also assist in slowing down vehicles and therefore may be better placed for installation at sites where vehicles travel slowly or are stopping, such as junctions, traffic control zones such as outside schools and car parks. This could also lead to a reduction in the number of road accidents.

Another aspect of the present invention relates to an energy harvesting system comprising at least one device according to the first aspect of the present invention installed within a structure, the at least one pneumatic or hydraulic pipe being connected to a turbine and generator.

The system may power local utilities, such as lighting, sensors, car park entrance barriers, signage and so on. Alternatively, the energy harvested may be stored or sent to the grid.

BRIEF DESCRIPTION OF THE DRAWINGS

For a better understanding of the present invention and to show more clearly how it may be carried into effect, reference will now be made by way of example only to the accompanying drawings in which:

FIGS. 3A, 3B, 3C and 3D are respectively an upper perspective view, a lower perspective view, a side view and a top plan view of an alternative embodiment of a rocker for an energy harvesting system according to the present invention;

FIGS. 4A and 4B are respectively side and upper perspective views of multiple overlapping rockers of the type shown in FIGS. 3A to 3D;

FIG. 5A is a schematic diagram of one embodiment of a cradle for receiving a rocker of the present invention;

FIG. 5B is a plan end view of the cradle shown in FIG. 5A;

FIG. 5C is an enlarged view of the circled region A of FIG. 5B;

FIG. 6B is a top plan view of the arrangement shown in FIG. 6A;

FIG. 6C is a side view of the arrangement shown in FIG. 6A;

FIG. 6D is a bottom plan view of the arrangement shown in FIG. 6A;

FIG. 6E is a cross sectional view through one rocker and cradle arrangement shown in FIG. 6A;

FIG. 7A to 7E are respectively an upper perspective view, a lower perspective view from one side, a lower perspective view of the other side, a side view and a top view of yet another embodiment of a rocker for an energy harvesting system according to the present invention;

FIG. 8A to 8E are respectively an upper perspective view, a lower plan view, a lower perspective view, an end view and a side view of another embodiment of a cradle for receiving a rocker for an energy harvesting system according to the present invention;

FIGS. 9A to 9D are respectively a front perspective view, an expanded view, a side view and a rear perspective view of a pair of rockers as shown in FIG. 7A to 7E pivotally secured within a pair of cradles as shown in FIGS. 8A to 8E, the cradles housing hydraulic pipes;

DETAILED DESCRIPTION

The present invention provides an improved system for harvesting energy from transportation infrastructures, such as roads. The crux of the invention is the installation of a novel rocker system at or near the surface of the road which is configured to transmit pressure on hydraulic fluid contained within one or more pipes positioned below the rocker system. This pressure serves to move fluid within the pipe which in turn is connected to a system for the generation of energy, such as a turbine to generate electricity.

Figure 1:
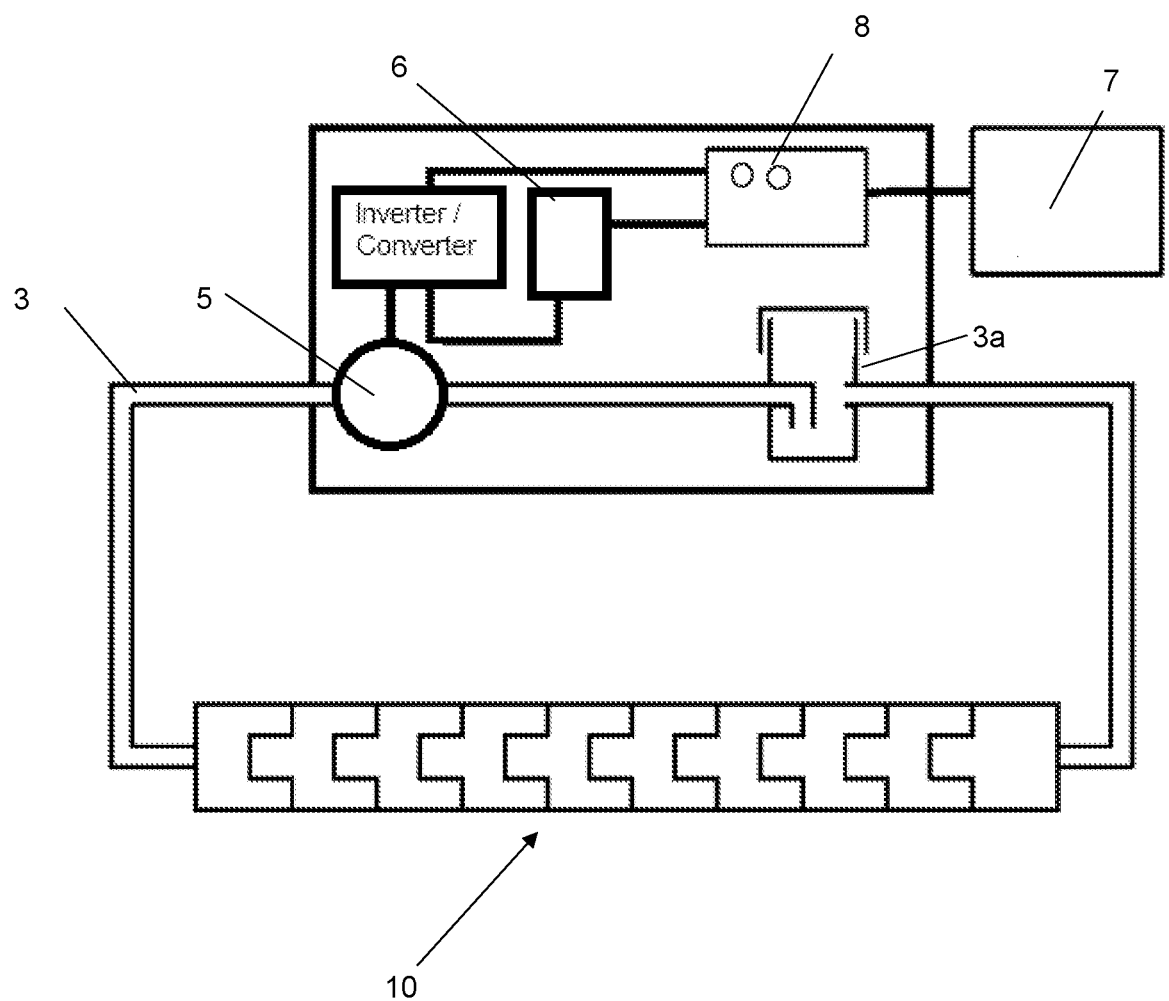
FIG. 1 is a schematic diagram of an energy harvesting system according to one embodiment of the present invention.

This general concept is illustrated schematically in FIG. 1 of the accompanying drawings. A rocker system 10 is installed within a road, pavement or other surface that receives movement of a load and, as a load (such as a vehicle) passes over the surface of the at least one rocker 10, the rocker rotates with respect to at least one pivot point to exert a force on at least one hydraulic pipe 3 located beneath the rocker in fluid communication with a pressure vessel 3a. This motion of the rocker transmits movement to the fluid which is used to transmit movement/force to a micro hydro generator 5. AC/DC electrical power 7 may be sent directly from generator or batteries 6 via the controller 8.

Figure 2A:
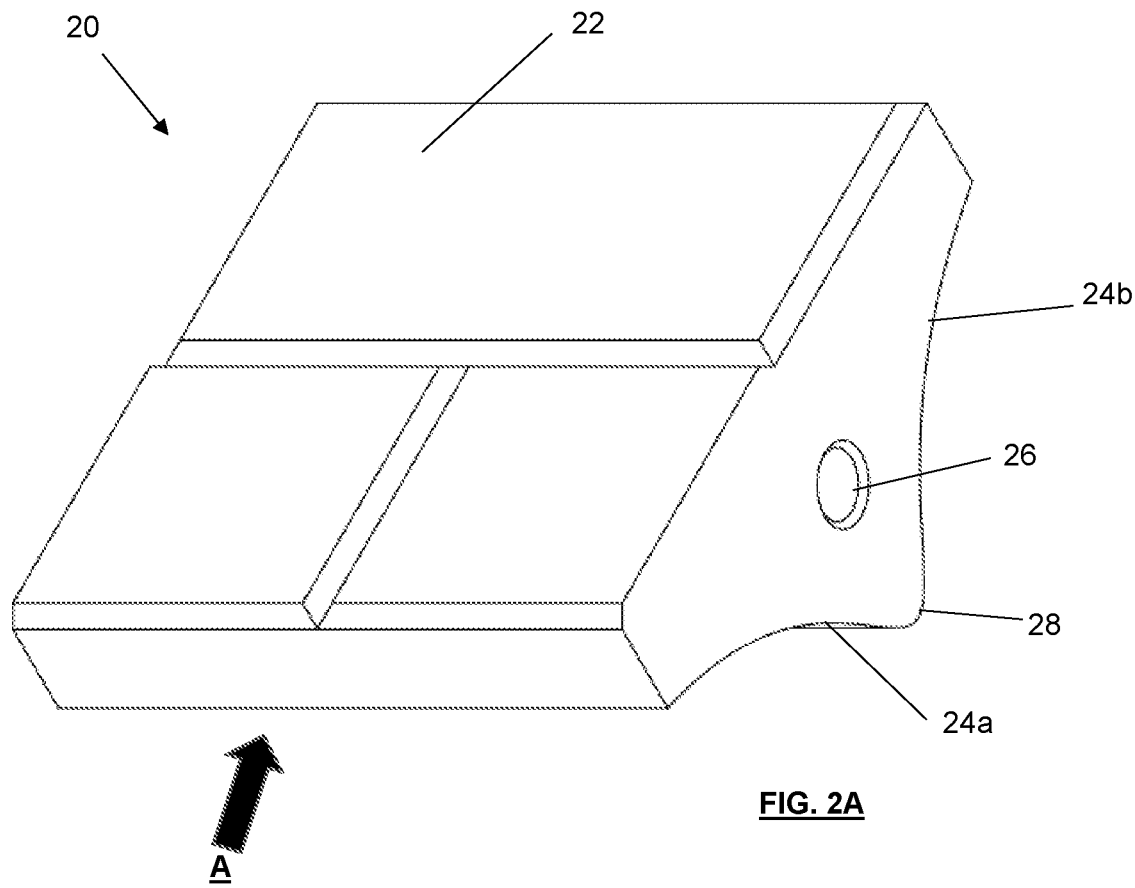
FIGS. 2A, 2B and 2C are respectively a perspective view, side view and top view of one embodiment of a rocker for an energy harvesting system according to the present invention.
Figure 2B:
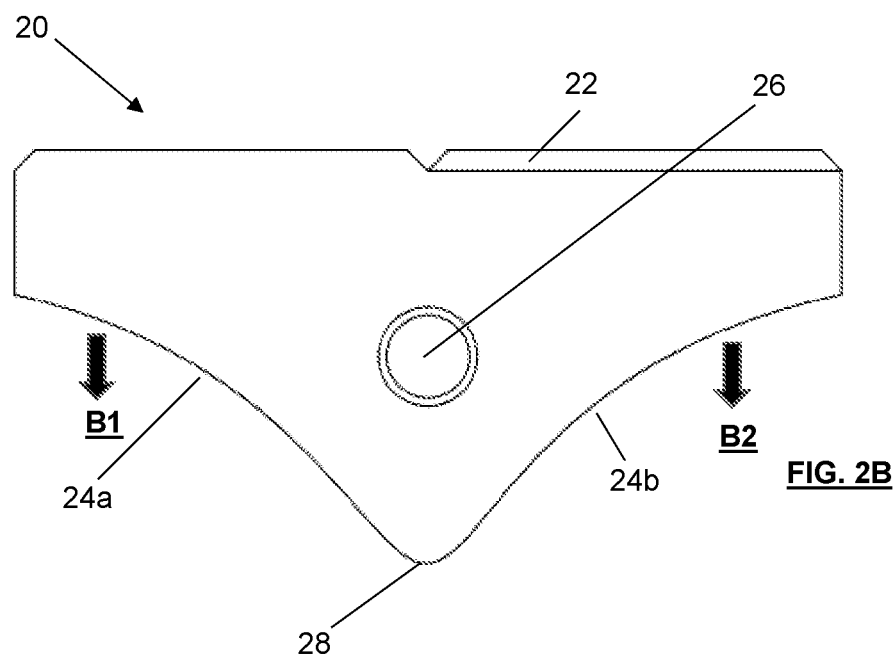
Figure 2C:
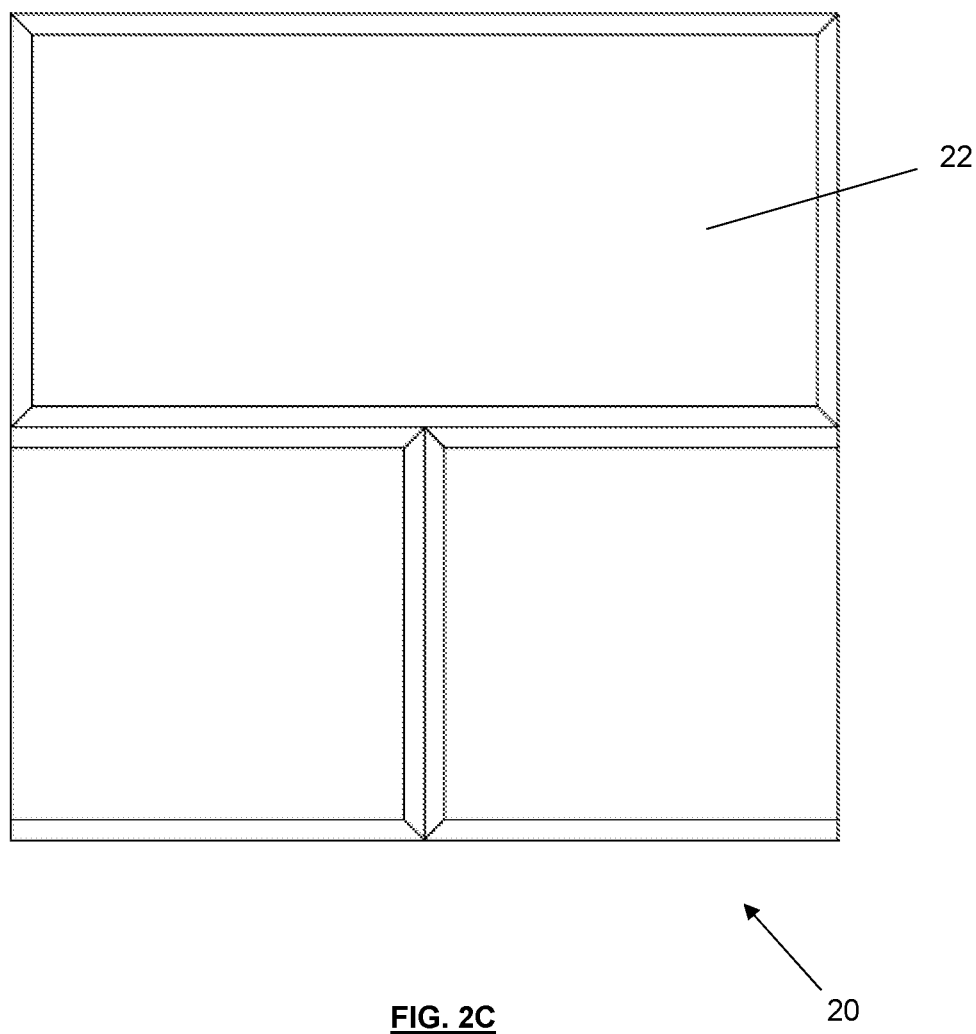

FIGS. 2A to 2C illustrate a rocker plate 20 according to one embodiment of the present invention which is particularly suitable for installing in pavements. The plate 20 has a contact surface 22 which is substantially planar, and which may be covered with a suitable covering, such as paving slabs. The plate has arcuate sides 24a, 24b providing camming surfaces, the sides meeting at a central apex 28. A hole 26 is provided above the apex 28 to enable the plate to be pivotally mounted within a bracket or cradle (not shown). Hydraulic pipes (not shown) are provided immediately below the camming surfaces 24a, 24b of the plate 20. In this manner, when a load such as a vehicle moves across the surface 22 (see arrow A in FIG. 2A) a downward pressure B1 is exerted on a first pipe situated below the first arcuate side 24a due to the rotation about pivot point 26. As the load moves across the plate, the load is released from the first camming surface causing this side to return to its original position and the load travels over the other side of the contact surface, causing the plate to pivot and exert downward pressure B2 on a second pipe positioned below the second arcuate side 24b. Pressure within the pipes causes movement of the fluid contained within the pipes which may be used for power generation.

This type of rocker plate is relatively cheap and easy to install, for example in paths of parkland where it may be connected to low energy utilities, such as individual lighting for signs. However, the downward movement for exerting pressure on the fluid pipe is intermittent (i.e., reciprocating motion) and therefore does not provide a continuous transfer of energy.

The Applicant has devised another type of rocker and cradle system that enables a substantially continuous flow of fluid through a horizontal pipe in the direction of travel of the load that moves across the system. This provides a substantial benefit over prior art systems that act downwardly and therefore intermittently on a hydraulic pipe and as such do not create a smooth and substantially continuous generation of power.

The application of substantially continuous pressure in a longitudinal direction of a hydraulic pipe is achieved by the provision of a series of rockers pivotally and slidably connected together to enable a progressive undulating movement of the rockers as a vehicle moves across their surface. This translates into a downward and horizontal movement of hydraulic fluid within the pipe. This represents a significant improvement over prior art hydraulic electromechanical energy harvester systems which all rely solely on application of a downward force on to the pipe.

FIGS. 3 to 6 illustrates one embodiment of a rocker and cradle system for incorporating into an energy harvesting system which provides for horizontal movement of fluid along a hydraulic pipe. FIGS. 3A to 4B illustrate one or more rockers 30 and FIGS. 5A to 5C illustrate an embodiment of a cradle 40 for pivotally supporting the rockers. FIGS. 6A to 6E demonstrate how these may be configured for installation within a transportation infrastructure to enable energy to be harvested from the passage of vehicles along their surface.

Referring to FIGS. 3A to 4B, each rocker 30 is substantially U-shaped comprising two substantially parallel legs 32a, 32b connected by a body portion 33, the arms 32a, 32b being separated by a recess 34 and each having a vertical slot 36. Additionally, a rear member 38 extends from the body portion and also includes slot 39. The upper and lower surfaces of the legs 32a, 32b curve upwardly to provide a rocking or cam surface 37a, 37b (see, in particular FIGS. 3C and 4A). The front recess 34 is of a similar dimension to the rear member 38 to enable the recess of one rocker to receive the rear member of an adjacent rocker (see FIGS. 4A and 4B) akin to pieces of a jigsaw puzzle fitting together, such that slots 36 of the legs of one rocker line up with slot 39 through the rear member of an adjacent rocker. The curved legs 32a, 32b having cam surfaces 37a, 37b results in the front part of each leg being higher than the rest of the rocker, as illustrated by X in FIG. 4B.

A cradle 40 or bracket is provided for receiving one or multiple rockers 35, as shown in FIGS. 5A to 5C. The cradle has a base 42 and substantially parallel side walls 44a, 44b and slots 46 are provided in the side walls, as illustrated in FIG. 5A. The slots are spaced apart at a distance corresponding to the distance between the slots 36 of adjacent rockers 30. The base 42 is configured to provide two parallel longitudinal troughs 48 running along each side of the base.

A series of rockers 30 and cradles 40 may be installed along a road or other infrastructure as illustrated in FIGS. 6A to 6D. In the illustrated embodiment, each cradle 40 houses two rockers 30 but it is to be appreciated that a cradle may house any additional number of rockers with the cradle being provided with a corresponding number of slots 46. The rockers are fitted together by placing a rear member 38 in the recess 34 of the rocker behind. This results in the slots 36, 39 of the overlapping rockers and the slots 46 of the supporting cradle aligning and a pin 50 is mounted from one side of the cradle, through the slots to the other side of the cradle (see, for example, FIG. 6A). Each end of the pin is provided with a larger head to prevent removal of the pin from the slots once the system has been assembled. Additionally, one or more hydraulic pipes 60, 62 are provided in the troughs 48 extending longitudinally below the series of rockers 30.

Figure 6A:
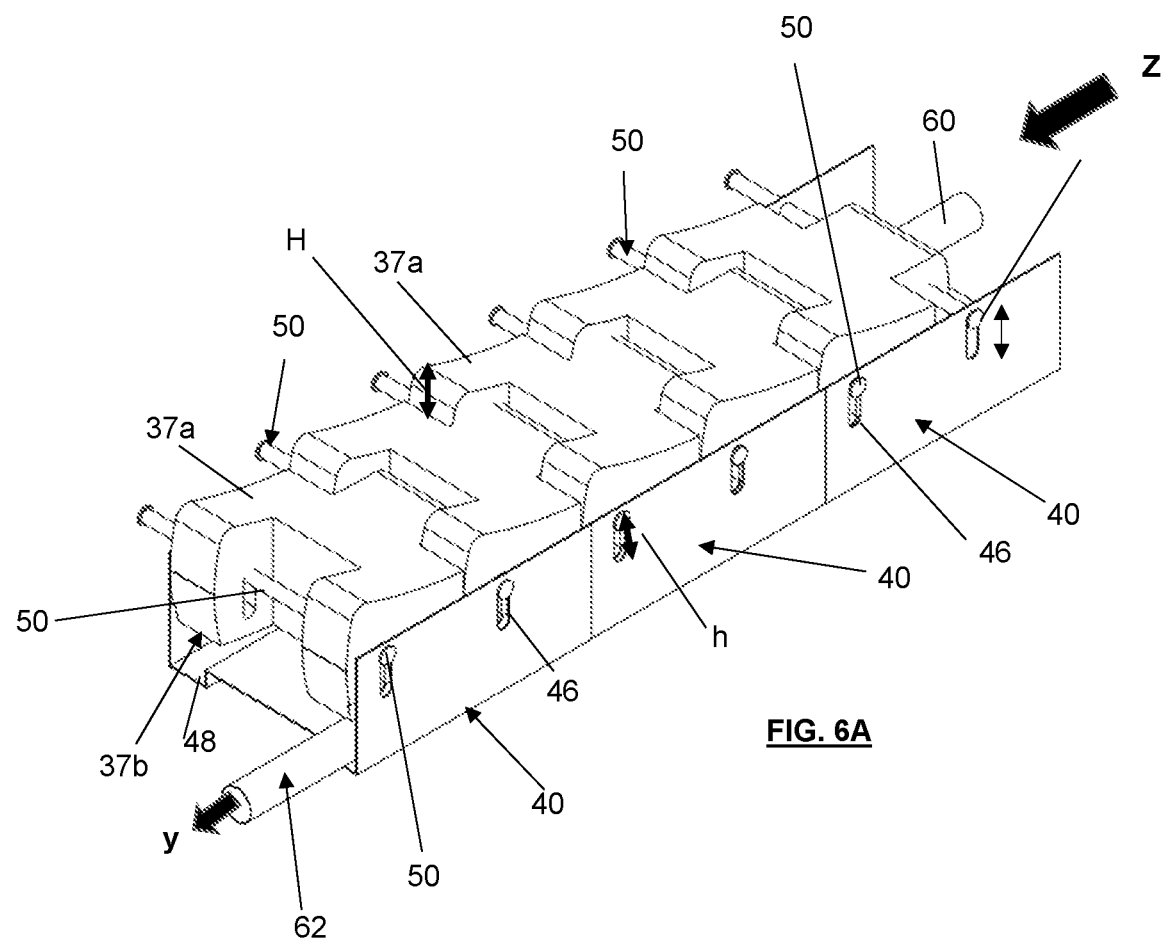
FIG. 6A is perspective upper view of multiple rockers of the type shown in FIGS. 3A to 3D secured within multiple cradles of the type shown in FIG. 5A, the cradles housing hydraulic pipes.
Figure 9D:
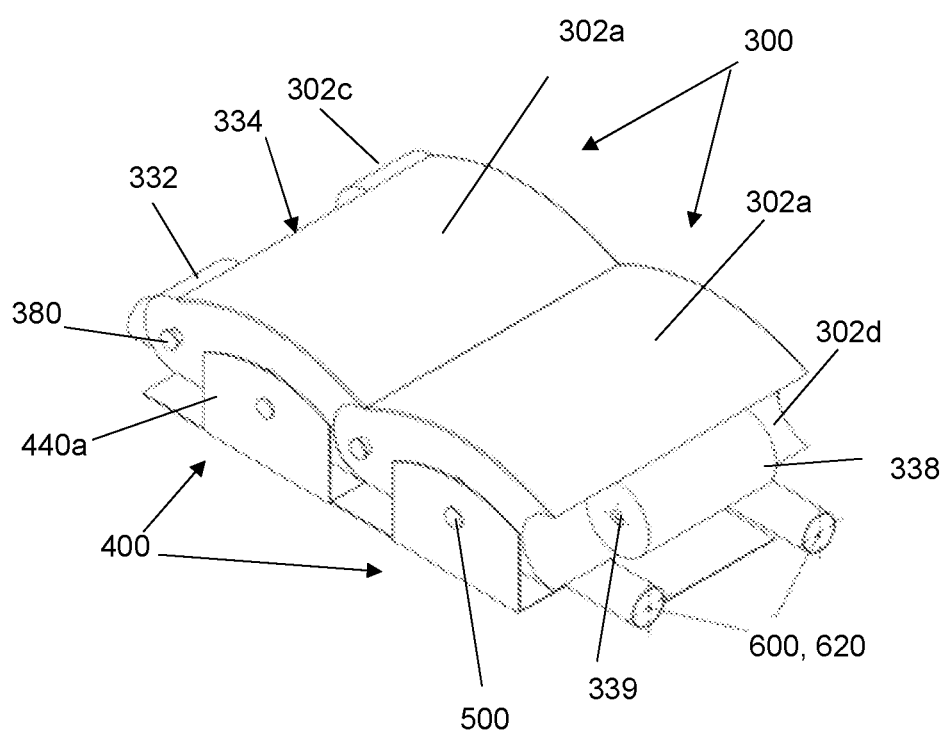

The rocker and cradle system as described above enables pressure to be applied downwardly and along the pipes 60,62 as a vehicle or other load pass over the surface of the rockers. Referring to FIG. 6A, a tyre of a vehicle may pass along the upper surfaces of the system as indicated by arrow Z. As the load passes over the cam surface 37a the rocker is able to move by a height H corresponding to the length h of the slots, imparting pressure on the pipe 60, 62 housed in the trough below the rockers. The arrangement of the overlapping rockers 30 enables the series of rockers to move consecutively as the load moves along the system pushing hydraulic fluid contained within the pipe 60, 62 along in a horizontal direction y. This rolling motion brought about by passage of a load across the top of the rockers 30 produces a more continuous movement of the hydraulic fluid along the pipe rather than reciprocal motion that provides an interrupted downward pressure. This in turns leads to a more constant harnessing and supply of energy from the system.

It is preferable for the riser pin located within the slot to be a height that is sufficient to provide enough compression of the pipe beneath, preferably being at least 25 mm in length. More preferably, the length of the slot is substantially equal to the diameter of the pipe. The pipe may have an elliptical cross-section to aid transfer of pressure. The inclined slope provided by the upper surface of the rocker provides the rolling pressure alone the pipe rather than an upward/downward reciprocal pressure on the pipe. Ideally each leg of the rocker is of a width to support a wheel of a car or other vehicle, for example being 400×400 mm.

FIGS. 7A to 9C illustrate an alternative embodiment of a rocker and cradle system according to the present invention. FIGS. 7A to 7E illustrate a rocker 300 and FIGS. 8A to 8E illustrate an embodiment of a cradle 400 for pivotally supporting the rocker. FIGS. 9A to 9D demonstrate how these may be configured for installation within a transportation infrastructure to enable energy to be harvested from the passage of vehicles along their surface. This embodiment provides a further improvement in the motion of the rockers for imparting horizontal movement of hydraulic fluid contained within a compressible pipe below the rockers by providing for pivotable movement of adjacent rockers in conjunction with a vertical movement of the rocker with respect to its respective cradle or bracket.

Referring to FIGS. 7A to 7E, the rocker 300 is shown in further detail. The rocker 300 has a main body 302 having an upper section 302a, a base 302b, side walls 303, a front wall 302c and a rear wall 302d. In the illustrated embodiment, the base 302b is substantially flat and the upper section has a curved profile. Additionally, the front wall 302c is convex, comprising a recess 334 flanked by cylindrical arms 332 with a bore 336 extending through each of the arms. The rear wall 302d is concave and is provided with a substantially cylindrical central portion 338 having a central bore 339. A slot 350 extends through substantially the centre of the main body 302.

Preferably, the rocker is made from a single moulded component and should form a solid structure, for example, comprising rubber crumb to ensure sufficient transfer of pressure through the device. The configuration of the rocker is such that multiple rockers can fit together in close contact by the central portion 338 of the rear wall fitting within the recess 334 of the front wall. This also results in the rear central bore 339 aligning with the bores 336 of the arms of an adjacent rocker.

The rockers are received within one or more cradles or brackets. FIGS. 8A to 8E illustrate an embodiment of a suitable cradle 400 for receiving a single rocker 300. The cradle has a base 402 and parallel side walls 440a, 440b extending substantially perpendicularly upwardly from the base. The side walls have opposing apertures 460, as illustrated in FIG. 8A. In the illustrated example, the base 402 is configured to have a central region with front legs 402b separated by a recess and a rear tab 402a corresponding in dimensions to the recess. However, the cradle may not be so shaped, for example, the base may be in the form of a square or rectangle provided with side walls. The cradle may be formed from folded sheet metal.

Two or more rockers 300 are pivotally mounted with respect to each other, as shown in FIGS. 9A to 9D, and mounted in one or multiple cradles 400. In this respect, the cylindrical central portion 338 at the rear of a rocker is received within the recess 334 of an adjacent rocker and a pivot pin 380 is secured through the bore created by the bores 336 and 339 of the adjacent rockers. Each rocker 300 is also pivotably mounted to the cradle 400 so that the slot 350 of the rocker aligns with the opposing apertures 460 in the side walls 440a, 440b of the cradle and a pin 500 extends through the apertures and slot. In both instances, the pin has a head or other means to ensure that at each end of the pin cannot be removed. In the embodiment shown in FIGS. 7A to 9C a single rocker 300 is received within a single cradle 400 but it is to be appreciated that a larger cradle to house multiple rockers, for example, by having a single base with spaced apart sets of parallel side walls.

The adjacent rockers being pivotally mounted with respect to each other and pivotally mounted with respect to the cradle at a distance spaced apart from the rocker pivot point enables the rockers to oscillate when a load passes over the upper surface 302a of the rocker. The slot 350 allows a limited degree of up and down movement of each rocker with respect to the cradle while the pivot 380 allows for a rocking or pivotal movement of adjacent rockers. The cumulative effect of this motion provides an oscillating motion. In this manner, hydraulic pipes 600, 620 may be placed directed beneath the rockers and the oscillating motion imparts a sinusoidal wave motion through the pipes to provide a substantially continuous movement of fluid through the pipes, leading to a more a substantially constant harnessing and supply of energy from the system.

Figure 10B:
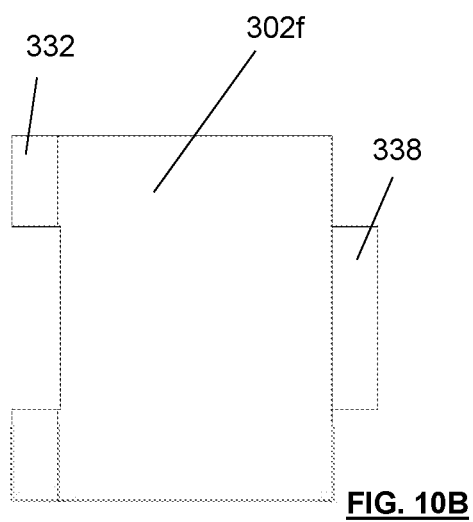
FIGS. 10A to 10C are respectively an upper perspective view, a top plan view and a side view of an alternative embodiment of a rocker for an energy harvesting system according to the present invention.
Figure 10A:
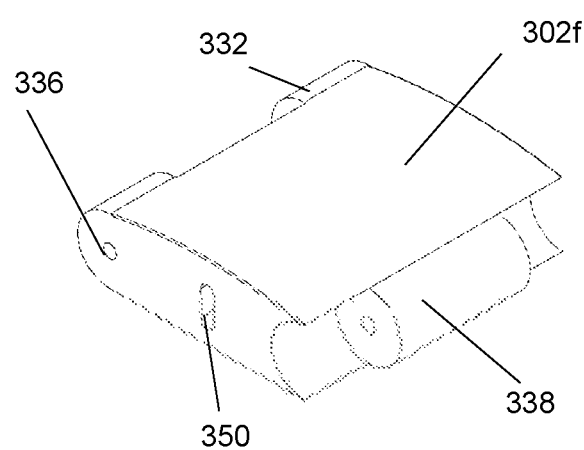
Figure 10C:
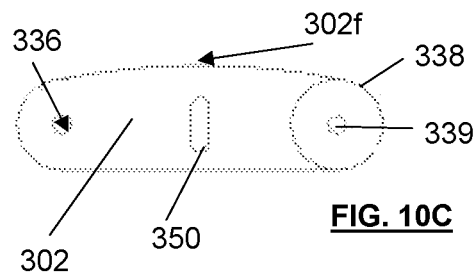

FIGS. 10A to 10C illustrate another embodiment of a rocker according to the present invention. Identical features already discussed in relation to FIGS. 7A to 9C are given the same reference numerals and only the differences will be discussed in detail. In particular, the upper surface 302f of the rocker is provided with a flatter profile relative to the rocker shown in FIGS. 7A to 7E. This type of rocker is more suitable to roads and other transport infrastructure where vehicles do not slow down. Embodiments having more curved profiles can assist in slowing down vehicles and therefore may be better placed for installation at sites where vehicles travel slowly or are stopping, such as junctions, traffic control zones such as outside schools and car parks.

It is preferable for all parts of the cradle and rocker system according to the present invention to be made from durable materials that will withstand repeated application of loads. The rockers are preferably made from rubber crumb with the cradle or bracket made from a strong metallic material, such as a galvanised steel. The pivot pins should also be made of strong materials, such as of reinforced stainless steel. The hydraulic pipes again should be durable but have the required degree of compressibility.

It is evident that the parts of the system can be easily replaced when required. The modular nature of the system is installed at the surface of the infrastructure making it easy to replace or repair each individual module is broken or worn. The system can also be applied to many types of structure regardless of size and be installed in sections.

Figure 11:
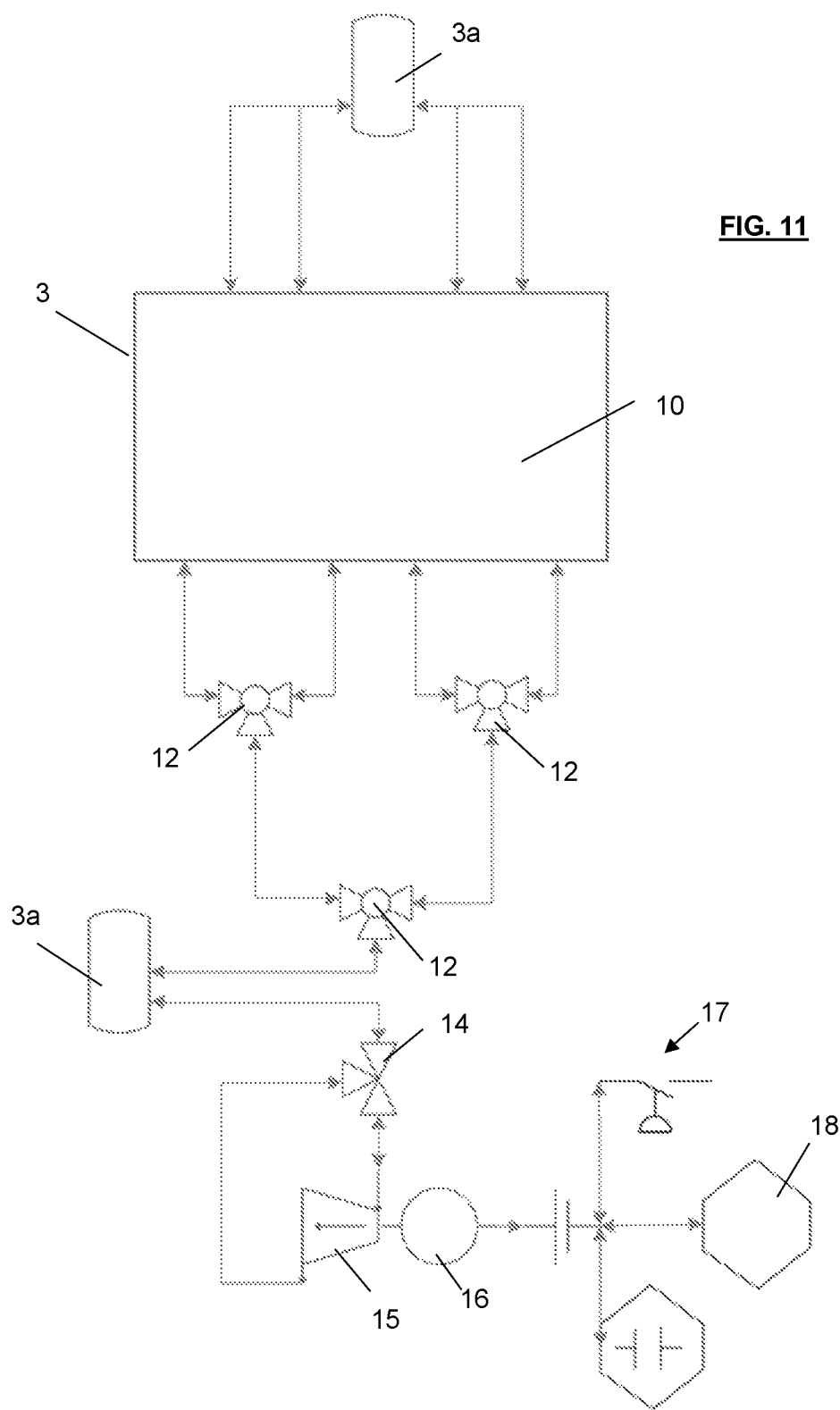
FIG. 11 is a flow diagram of illustrating one directional flow of hydraulic pressure imparted by a system of the present invention for harvesting energy.
Figure 12:
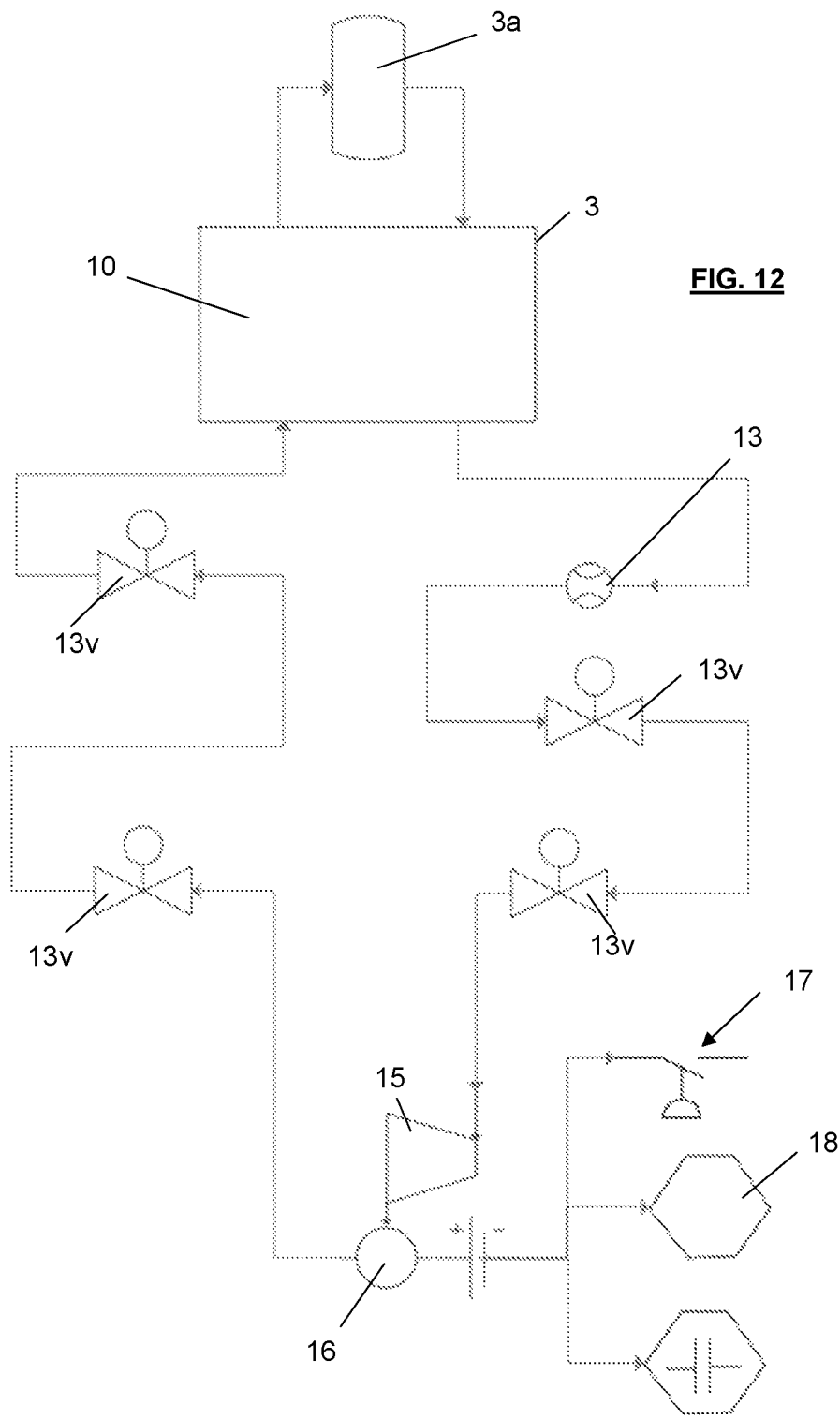
FIGS. 12 and 13 are flow diagrams of a bi-directional flow of hydraulic pressure imparted by the system of the present invention for harvesting energy.
Figure 13:
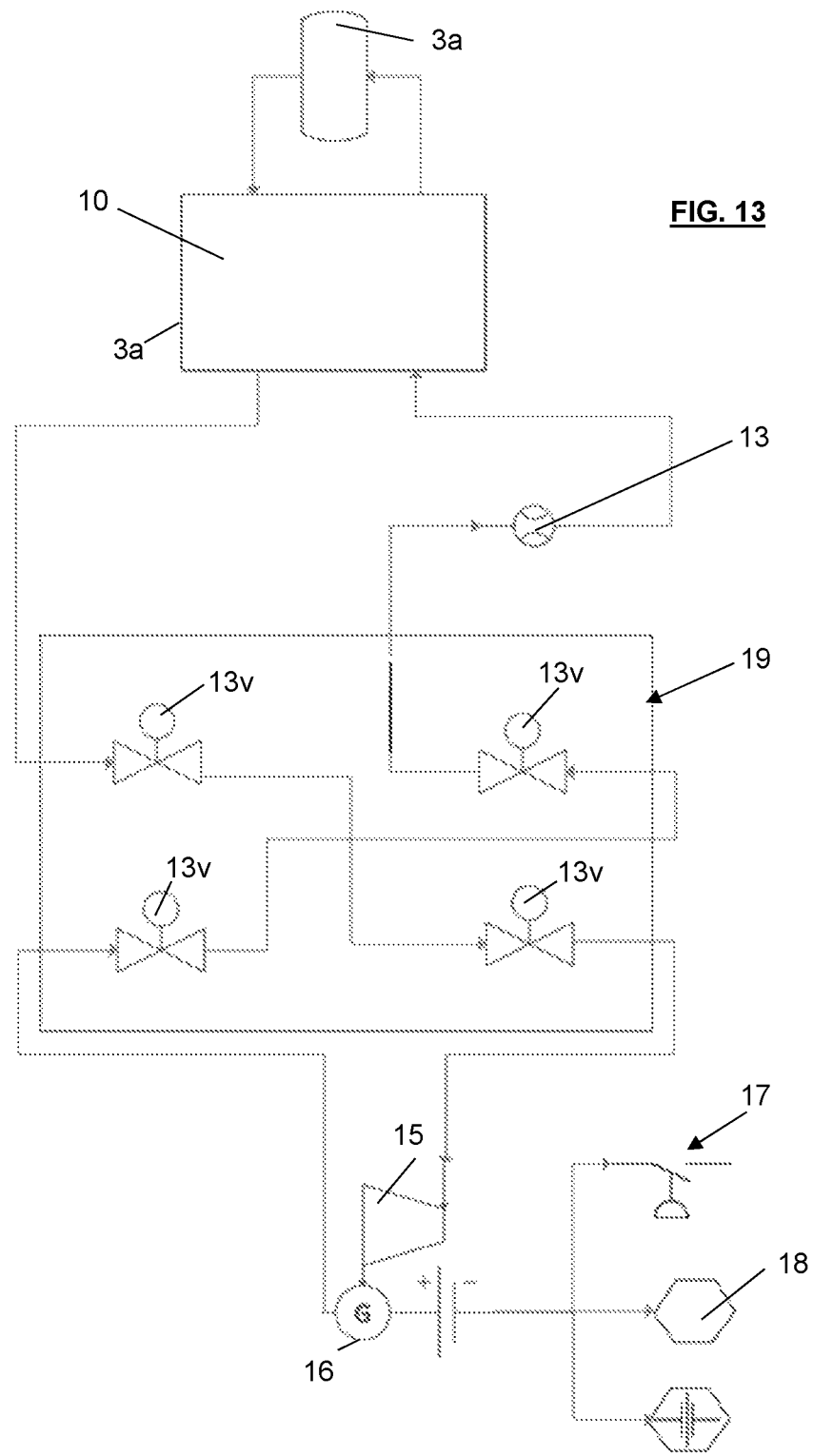

FIGS. 11 to 13 of the accompanying drawings provide schematic diagrams illustrating how the flow of fluid along the hydraulic pipes provided beneath the rocker and cradle systems according to the present invention may be utilised to convert kinetic energy of a vehicle or other load according to the invention to other types of energy, such as electricity. In FIG. 11, a rocker and cradle kinetic energy system 10 according to an embodiment of the present invention is installed within transport infrastructure, such as a car park entrance or road. The hydraulic pipes 3 are connected to pressure vessels 3a and energy from movement of a vehicle or other load across the system 10 imparts pressure to create a flow of fluid through the pipes. The arrows in FIG. 11 show the potential direction of flow at a given point within the system. A series of solenoid 3-way valves 12 and 3-way valve 14 connect the flow of fluid to a turbine 15, optionally via a fly wheel (not shown), which is connected to a generator 16. The generates electricity which by used to provide power, for example to street lighting 17, sensors 18 or other utilities requiring electrical power. Alternatively, the energy harvested may be stored or sent to the national grid.

A similar arrangement is shown in FIGS. 12 and 13 in which identical features are provided with the same reference numerals. This embodiment has a reverse flow unit 19 to enable energy to be harnessed from the rocker and cradle system 10 irrespective of the direction of travel over a load over the surface. One or more flow sensors 13 are included in the system for activation of sensor activated valves 13v. FIGS. 12 and 13 illustrate respectively forward and reverse flow through the system.

Further modifications to the aforementioned energy harvesting system may be made without departing from the principles embodied in the examples described and illustrated herein.

The invention claimed is:

1. A device for installation within or on a structure for transferring kinetic energy from a load moving across the structure to a pneumatic or hydraulic system, the device comprising:
   at least two adjacent rockers, each rocker in the at least two adjacent rockers having an upper surface for passage of the load; and
   at least one cradle supporting the at least two adjacent rockers within or on the structure,
   wherein each rocker in the at least two adjacent rockers is pivotally and slidably mounted to at least one of (i) another rocker in the at least two adjacent rockers, and (ii) the at least one cradle,
   wherein the at least one cradle houses at least one compressible pneumatic or hydraulic pipe disposed between the at least two adjacent rockers and the at least one cradle,
   wherein application of the moving load to the upper surfaces of the at least two adjacent rockers provides a rolling motion on the at least one compressible pneumatic or hydraulic pipe.

2. The device as claimed in claim 1, wherein each of the at least two adjacent rockers comprises a plate having a respective upper surface of the upper surfaces and at least two side members extending from opposing edges of the plate, each side member of the at least two side members having converging dependent sides meeting at an apex at a lowermost point opposite the upper surface and a pivot point provided between the converging sides.

3. The device as claimed in claim 2, wherein the converging sides are arcuate to provide camming surfaces.

4. The device as claimed in claim 1, wherein each rocker in the at least two adjacent rockers is substantially U-shaped and comprises two substantially parallel legs connected by a body portion, the two substantially parallel legs being separated by a recess, wherein each leg in the two substantially parallel legs having a vertical slot, and wherein each rocker in the at least two adjacent rockers having a rear member extending from the body portion, the rear member including a corresponding vertical slot.

5. The device as claimed in claim 4, wherein the front recess is of a similar dimension to the rear member to enable the recess of one rocker to receive the rear member of an adjacent rocker, the slots of the legs of one rocker aligning with the slot through the rear member of an adjacent rocker.

6. The device as claimed in claim 1, wherein the at least two adjacent rockers are pivotally connected to each other and slidably mounted to the at least one cradle.

7. The device as claimed in claim 6, wherein each rocker in the at least two adjacent rockers is configured to mate with another rocker and a pivot point is provided between pivotally mounted mating parts, wherein each of the pivotally mounted mating parts has an arcuate surface to aid rotation with respect to each other.

8. The device as claimed in claim 6, wherein each rocker is separately slidably connected to the cradle, each rocker having a central slot for passage of a pin connected to the cradle, the slot allowing a predefined amount of vertical movement of the rocker with respect to the cradle.

9. The device as claimed in claim 6, wherein each rocker has a main body having an upper section, a base, side walls, a front wall and a rear wall, wherein the front wall is convex and includes a recess flanked by cylindrical arms with a bore extending through each of the arms, and the rear wall is concave and includes a substantially cylindrical central portion having a central bore, the recess and the central portion forming the mating parts of adjacent rockers.

10. The device as claimed in claim 1, wherein the at least one cradle has a base and side walls extending upwardly therefrom, the base supporting the at least one compressible pneumatic or hydraulic pipe and the side walls of the at least one cradle providing a pivoting and/or sliding connection to at least one rocker in the at least two adjacent rockers.

11. The device as claimed in claim 10, wherein each side wall of the cradle has a bore for receiving a pin that pivotally connects the rocker to the cradle.

12. The device as claimed in claim 10, wherein a vertical slot is provided in each side wall of the cradle and a pin is provided through the slots of the cradle and the rocker to enable slidable movement of the rocker with respect to the cradle.

13. The device as claimed in claim 12, wherein the upper surface of each rocker in the at least two adjacent rockers inclines upwardly in a direction of movement of the load, wherein each rocker in the at least two adjacent rockers has substantially parallel upper and lower surfaces that are both inclined upwardly in the intended direction of movement of the load, wherein each rocker in the at least two adjacent rockers has at least one slot between the upper and lower surfaces for pivotal and slidable connection to the at least one cradle, with the at least one compressible pneumatic or hydraulic pipe being provided below the lower surfaces.

14. The device as claimed in claim 10, wherein a vertical slot is provided in each side wall of the at least one cradle and a pin is provided through the slots of the at least one cradle and the at least one rocker to enable slidable movement of the at least one rocker with respect to the at least one cradle, a height of the vertical slot being substantially equal to a diameter of the at least one compressible pneumatic or hydraulic pipe to provide compression of the at least one compressible pneumatic or hydraulic pipe beneath the at least one rocker.

15. The device as claimed in claim 10, wherein the base of the at least one cradle is configured to provide two parallel longitudinal troughs running along each side of the base for housing the at least one compressible pneumatic or hydraulic pipe.

16. The device as claimed in claim 14, wherein the height of the vertical slot is at least 25 mm in length, and wherein the length of the slot is substantially equal to the diameter of the pipe.

17. The device as claimed in claim 1, wherein multiple of the at least two adjacent rockers are provided in a single or multiple cradles of the at least one cradle to provide a longitudinal surface track for passage of the load, the at least one compressible pneumatic or hydraulic pipe being supported along the longitudinal surface beneath the multiple adjacent rockers, and wherein adjacent rockers in the multiple adjacent rockers are configured to interconnect to provide rolling compression of the pipe as the load travels along the longitudinal surface.

18. An energy harvesting system comprising at least one device according to claim 1 installed within a structure, the at least one pneumatic or hydraulic pipe being connected to a turbine and generator.

19. The energy harvesting system as claimed in claim 18, wherein the structure is a road or pavement.

20. The energy harvesting system as claimed in claim 18, wherein the structure is a car park or entrance to a car park.

* * * * *